May 6, 1924.
L. P. DESTRIBATS
TIRE FABRIC BUILDING MACHINE
Filed June 17, 1920
1,493,068
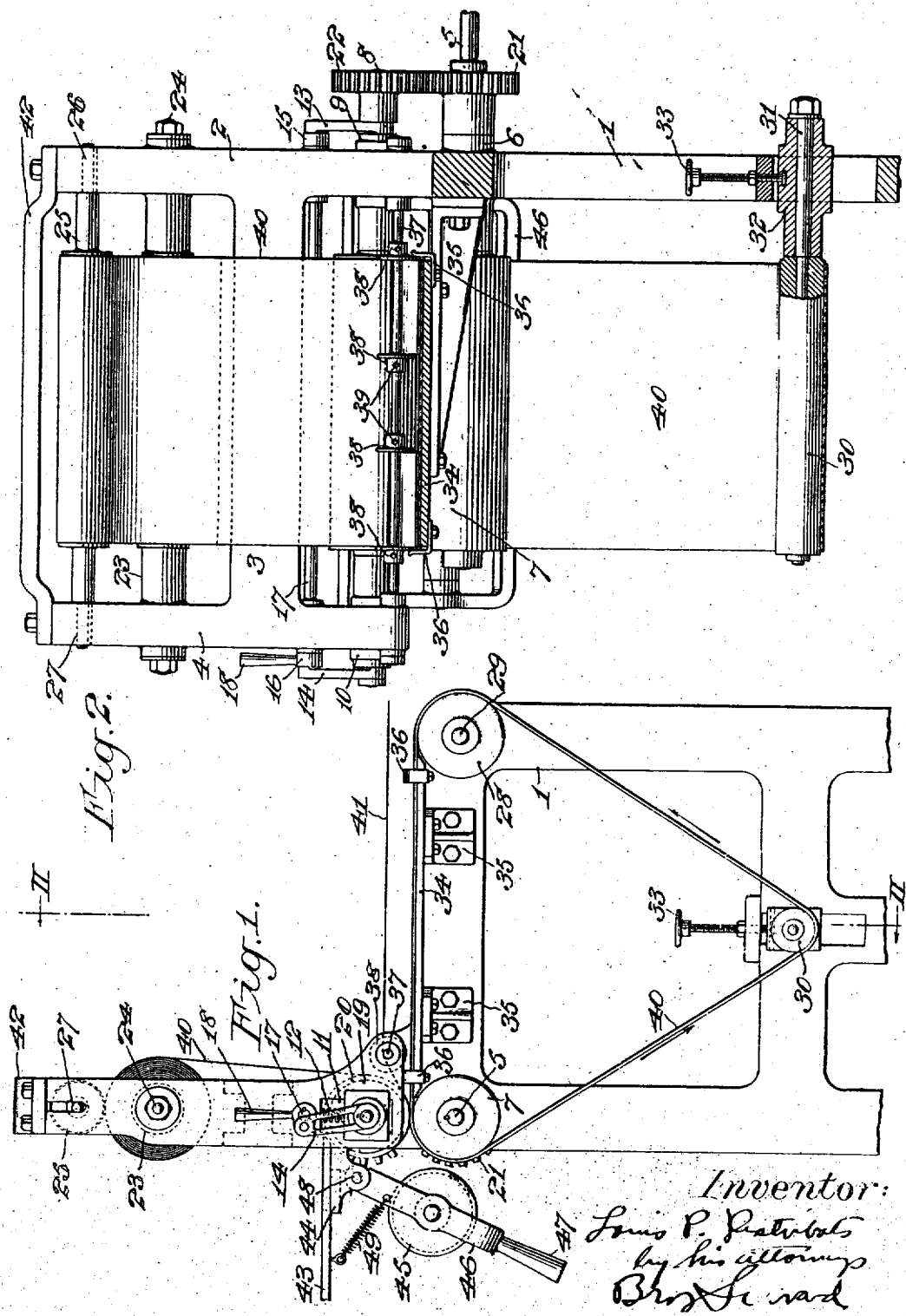
Inventor:
Louis P. Destribats
by his attorneys Patented May 6, 1924.

1,493,068

UNITED STATES PATENT OFFICE.

LOUIS P. DESTRIBATS, OF TRENTON, NEW JERSEY.

TIRE-FABRIC-BUILDING MACHINE.

Application filed June 17, 1920. Serial No. 389,666.

*To all whom it may concern:*

Be it known that I, LOUIS P. DESTRIBATS, a citizen of France, and resident of Trenton, in the county of Mercer and State of New Jersey, have invented a new and useful Improvement in Tire-Fabric-Building Machines, of which the following is a specification.

This invention relates to a machine for partially forming the fabric carcasses of pneumatic tires, and more particularly the carcasses of the outer shoes or casings of automobile tires, and has for an object to provide such an apparatus which is adapted to assemble the several strips or plies of fabric, used in forming the tire carcass, into an endless flat band, for subsequent application to the device upon which the fabric is to be formed into its designed shape.

Another object consists in providing such a machine in which the rubber covering that is to subsequently form the tread of the tire may be properly positioned upon the fabric band in close contact therewith.

Another object consists in providing certain improvements in the form, construction and arrangement of the several parts whereby the above named and other objects may be effectively attained.

A practical embodiment of the invention is represented in the accompanying drawings, in which Fig. 1 represents a side elevation of the machine.

Fig. 2 represents a section therethrough, taken in the plane of the line II—II of Fig. 1, looking in the direction of the arrows.

The machine includes an upright framework, which may be suitably supported, as upon a pedestal bolted to the floor. This frame is of an open, substantially rectangular form in its lower part, as indicated at 1, from which lower part there arises a stanchion 2 that carries a laterally extending arm 3 which has a vertical cross head 4. This cross head 4 is parallel with and substantially equal in length to the stanchion 2, and provides bearings for certain shafts to be hereinafter described.

A main shaft 5 is mounted, as a stub shaft, in a bearing 6 that is formed in the upper part of the open framework 1, and this shaft projects from the said framework in the same direction as the arm 3. This shaft may be actuated from a suitable source of power, and it constitutes the main drive for the machine. This shaft 5 carries a roll 7, composed of metal or other suitable material, which roll is fixed to rotate with the shaft.

Another shaft 8 is journaled at 9 and 10 in the stanchion 2 and cross head 4, immediately above the shaft 5. The journals 9 and 10 for the shaft 8 are slidably mounted in the stanchion 2 and cross head 4, as indicated at 11, and expansion coil springs, one of which is shown at 12, serve to yieldingly hold the said journals, and hence the shaft carried thereby, in the lowermost position. Each end of the shaft 8 carries a link 13, 14, which are connected to short arms 15, 16, that are keyed to a rod 17, which is rotatably mounted in the stanchion 2 and cross head 4 immediately above and in axial alignment with the shaft 8. A handle 18 is fixed to the short arm 16, and it will be seen that by rocking this handle to the right (Fig. 1) the shaft 8 will be raised with its bearings against the action of the springs 12.

This shaft 8 also has a roll 19 fixed to rotate therewith, which roll has a rubber covering 20; and when the shaft 8 is permitted to be depressed by the springs 12, this rubber covering on its roll rests in frictional contact with the roll 7 on the shaft 5. A gear 21 is fixed on the shaft 5 and meshes with a gear 22 carried by the shaft 8, so that the last named shaft is driven from the shaft 5. When the handle 18 is swung so as to lift the shaft 8, it not only separates the rubber covered roll 19, from the roll 7, but also disengages the gears 21 and 22.

At some distance above the shaft 8, there is mounted in the stanchion 2 and cross-head 4 a stock roll 23, which is removably held in position by a bolt 24. This stock roll is designed to carry strips of fabric, such as the duck which is ordinarily used in forming tire carcasses, which strips have been suitably treated with vulcanizable rubber compound in the customary manner and cut on the bias in suitable lengths. As this treated fabric is very adhesive, it is customary to wind it up on a roll together with an intermediate strip of untreated fabric, such as muslin, in order to prevent the several layers from adhering to each other, and, as a take up for this muslin strip when the treated fabric is unwound from the roll 23, I provide a smaller roll 25, that is slidably and rotatably mounted in the stanchion 2 and cross head 4 as indicated at 26, 27. The mounting of this roll 25 is such as to permit it to be driven by surface contact with the material on the stock roll 23, and its slidable mounting enables it to move away from the last named roll as its size increases due to the acquisition of more and more of the muslin strip.

Another roll 28, which is similar to the roll 7, is rotatably mounted on a stub shaft 29 that is carried by the framework 1 in a manner similar to the mounting of the shaft 5. It will be noted that the roll 7 is located at one upper corner of the rectangular frame 1, while the roll 28 is located at the other upper corner thereof.

Still another roll 30, is rotatably carried by a stub shaft 31 that is mounted in an adjustable bearing 32 slidably fitted in the lower part of the open frame 1. This bearing 32 may be raised and lowered by means of a hand screw 33.

Intermediate the rolls 7 and 28, there is located a table 34 which is carried by brackets 35 which are bolted to the upper part of the open frame 1. This table extends from one of the said rolls to the other, and is of a width substantially equal to the length of the said rolls. A pair of guide clips 36 are screwed to the edges of the table 34 at each side thereof.

A rod 37 is rotatably mounted in the stanchion 2 and cross head 4 above the table 34 and adjacent the rolls 7 and 19. Four flanged collars 38 are slidably mounted on the rod 37 and provided with set screws 39 for temporarily securing them against movement on the rod in any desired positions. It will be observed that the two collars at each side are arranged with their flanges toward each other, so that each pair, when properly adjusted, may be adapted to perform the function of a guide.

The parts above described are designed to be used in forming the fabric band and the operation is as follows:

The leading end of the fabric from the stock roll 23, which fabric is denoted by 40, is passed between the roll 19, and the roll 7, while the former roll is in its elevated position. This fabric is then led by hand around the rolls 7, 30 and 28, and its end laid upon the table 34. At this stage, the rear end of the said strip will appear in the fabric between the stock roll 23 and the roll 19, as it is customary to lap the ends of these treated fabric strips and temporarily stick them together in winding up the stock roll. This rear end of a strip may then be separated from the following strip, and brought down onto the table 34. The two ends of the first strip are then lapped and caused to unite by adhesion while resting on the said table. Thus a band composed of a single strip or layer has been formed about the rolls 7, 30 and 28 in substantially triangular form, as plainly shown in Fig. 1. After this single band has been formed, it may, if desired, be tightened by turning down the hand screw 33 and thus depressing the roll 30.

Next the leading end of the second or succeeding strip of treated fabric is inserted between the rolls 7 and 19, and the handle 18 turned so as to permit the last named roll to be yieldingly pressed down and grip the fabric between it and the roll 7. The main shaft 5 is now caused to be actuated in any well known or approved manner, as for instance by pulling a suitable lever or depressing a suitable treadle, neither of which are shown as they are common means well understood in this industry. The shaft 5 is thus rotated in such a manner as to draw the next ply of fabric to the left, Fig. 1. It will be clear that this leading edge of the second ply will be caused to stick or adhere to the first ply as a result of the pressure of the roll 19, and thus the said two plies will be driven along together following the course outlined by the first ply, around the rolls 7, 30 and 28, until the leading end of the second ply is above the table 34. At this juncture the operation of the machine will be stopped and the rear end of the second ply separated from the stock on the roll, lapped over the leading end of said ply and brought into adherence therewith. In this condition, there will be two plies adhering together and resting in triangular formation as already described. This operation may be repeated until the number of plies which are desired to be in the completed tire, under the beads thereof, have been put in place; and it will be clear that, as the machine is started for the placing of each additional ply, the pressure of the roller 19, will serve to firmly press the rear end of the next preceding ply against the ply preceding it, in order to eliminate any faulty adherence which may exist after the said rear end has been placed by hand onto the remainder of the fabric for lapping with its leading end, as described.

The next operation is to introduce a pair of ribbons of untreated fabric, such for instance as muslin, the ends of which are passed over the rod 37 between the collars 38 and caused to adhere to the treated fabric 40 immediately adjacent the rolls 7, and 19. The purpose of these strips is to prevent the next ply of treated fabric from firmly adhering to the preceding ply, as it is desired to separate the fabric at this point, in the subsequent operation of building the tire, in order to permit the insertion of the beads. During this step the collars 38 serve to guide the ribbons into exactly the desired relationship with respect to the treated fabric. These muslin ribbons are indicated by 41 and they may be conveniently cut to substantially the same length as the plies 40 and hung on a suitable rack at the hand of the operator.

Following this, succeeding plies of treated fabric are positioned in exactly the same manner, but it is customary for these following plies to be somewhat wider than the preceding ones, in order to enable them to properly surround and enclose the beads of the tire. The guide clips 36 are secured to the table 34 by a screw and slot arrangement so as to permit them to be adjusted inwardly or outwardly with respect to the table, and this enables them to act as guides for both the narrower and wider plies of treated fabric and keep them true on the table 34.

After the desired number of wider plies or strips have been positioned as indicated, the handle 18 may be turned so as to elevate the roller 19, and the screw 33 turned so as to elevate the roller 30 and slacken the band of fabric plies. The band may then be lifted over the guide clips 36 and withdrawn edgewise from the rollers 7, 30 and 28, after which it may be used in the manufacture of the contemplated tire. The manner in which I prefer to build a tire from this fabric band is set forth in my co-pending application, Serial No. 389,665, filed June 17th, 1920.

It will be understood that, during the withdrawal of the treated fabric 40 from the stock roll 23, the intervening strip of muslin is automatically wound up on the roll 25, after its leading end has been passed around said roll by hand. The said roll 25 is held against accidental movement out of the stanchion 2 and cross-head 4 by a cap-bar 42.

Suitable means are provided for applying to the fabric band the rubber which is to compose the tread of the tire, in case the operator so desires, and this means includes a feeding board 43, which is carried by brackets 44 formed integral with the stanchion 2 and cross-head 4, and having its inner end immediately adjacent the upper part of the roll 19.

A concave roller 45 is mounted in a chape 46 which has a handle 47 and the other end of which is pivoted to a rod 48 that is secured in the brackets 44. A retractile coil spring 49 is fastened to the chape 46 and feed board 43 in order to yieldingly hold the roller 45 away from the contact with the roll 7. This roller 45 has its periphery concave to approximately the size and shape of the designed tread for the contemplated tire, and it is mounted about centrally of the roll 7, so that it may be depressed by means of the handle 47 into contact with the central portion of the fabric band or rubber thereon.

In placing this rubber, a suitable strip or strips thereof is or are fed along the board 43 around the roll 19, and then between the last named roll and the roll 7 while the roll 19 is elevated. The said roll is then depressed and the machine started in operation, which will draw the rubber strip around with the fabric band just as in the case of a strip of fabric. When the leading end of the rubber strip reaches a position on the table 34 near the rod 37, the machine is stopped, and the rear end of the said strip pulled off from the roll 19, passed under the rod 37, and matched with its leading end to constitute a complete endless rubber covering on the center of the fabric band. During the operation of the machine in this step, the roller 45 may be pressed down against the rubber as it passes around the roll 7 in order to cause it to firmly adhere to the fabric band; and, after the ends of the rubber strip have been matched, the operation of the machine may be continued a little further in order to cause the rear end of the rubber to pass between the rolls 7 and 19, and be subjected to the action of the roller 45. When the rubber strip has been thus applied, the composite fabric and rubber band may be removed from the machine in the same way as described in connection with the removal of the fabric band only.

While I have described the feed board as being used for the purpose of inserting the rubber strip only, it may be noted that the same is adapted for feeding in fabric strips, instead of feeding them from the stock roll 23, or in addition to feeding them from the stock, if desired.

It will be understood that various changes may be resorted to in the form, construction and arrangement of the several parts, without departing from the spirit and scope of my invention and hence I do not intend to be limited to the details herein shown and described, except as they may be included in the claims.

What I claim is:

1. Apparatus of the character described comprising, a support of open formation, means for supplying strips of fabric successively thereto to form an endless band, and an intermediate device for supporting the ends of the strips while they are being united.

2. Apparatus of the character described comprising, a support of open formation, means for supplying strips of fabric successively thereto to form an endless band, an intermediate device for supporting the ends of the strips while they are being united, and means for pressing the strips into close mutual contact.

3. Apparatus of the character described comprising, a support of open formation, means for supplying strips of fabric successively thereto to form an endless band, an intermediate device for supporting the ends of the strips while they are being united, and means for supplying a rubber covering to said band.

4. Apparatus of the character described comprising, a set of elements arranged in open formation, means for supplying strips of fabric successively thereto to form an endless band, and an intermediate device for supporting the ends of the strips while they are being united.

5. Apparatus of the character described comprising, a set of elements arranged in open formation, means for supplying strips of fabric successively thereto to form an endless band, and means for supplying a rubber covering to said band.

6. Apparatus of the character described comprising, a set of elements arranged in open formation, means for supplying strips of fabric successively thereto to form an endless band, an intermediate device for supporting the ends of the strips while they are being united, and means for pressing the strips into close mutual contact.

7. Apparatus of the character described comprising, a set of elements arranged in open formation, means for supplying strips of fabric successively thereto to form an endless band, an intermediate device for supporting the ends of the strips while they are being united, and means for supplying a rubber covering to said band.

8. Apparatus of the character described comprising, a set of elements arranged in open formation, means for supplying strips of fabric successively thereto to form an endless band, means for pressing the strips into close mutual contact, and means for supplying a rubber covering to said band.

9. Apparatus of the character described comprising, a set of elements arranged in open formation, means for supplying strips of fabric successively thereto to form an endless band, means for pressing the strips into close mutual contact, means for supplying a rubber covering to said band, and means for pressing said covering into close contact with the band.

10. Apparatus of the character described comprising, a set of rolls arranged in open formation, means for supplying strips of fabric successively thereto to form an endless band, and an intermediate device for supporting the ends of the strips while they are being united.

11. Apparatus of the character described comprising, a set of rolls arranged in open formation, means for supplying strips of fabric successively thereto to form an endless band, and means for supplying a rubber covering to said band.

12. Apparatus of the character described comprising, a set of rolls arranged in open formation, means for supplying strips of fabric successively thereto to form an endless band, an intermediate device for supporting the ends of the strips while they are being united, and means for pressing the strips into close mutual contact.

13. Apparatus of the character described comprising, a set of rolls arranged in open formation, means for supplying strips of fabric successively thereto to form an endless band, an intermediate device for supporting the ends of the strips while they are being united, and means for supplying a rubber covering to said band.

14. Apparatus of the character described comprising, a set of rolls arranged in open formation, means for supplying strips of fabric successively thereto to form an endless band, means for pressing the strips into close mutual contact, and means for supplying a rubber covering to said band.

15. Apparatus of the character described comprising, a set of rolls arranged in open formation, means for supplying strips of fabric successively thereto to form an endless band, means for pressing the strips into close mutual contact, means for supplying a rubber covering to said band, and means for pressing said covering into close contact with the band.

16. Apparatus of the character described comprising, a support of open formation, means for supplying strips of fabric successively thereto to form an endless band, and means for inserting separating ribbons between certain of said strips of fabric.

17. Apparatus of the character described comprising, a support of open formation, means for supplying strips of fabric successively thereto to form an endless band, an intermediate device for supporting the ends of the strips while they are being united, and means for inserting separating ribbons between certain of said strips of fabric.

18. Apparatus of the character described comprising, a support of open formation, means for supplying strips of fabric successively thereto to from an endless band, means for pressing the strips into close mutual contact, and means for inserting separating ribbons between certain of said strips of fabric.

19. Apparatus of the character described comprising, a support of open formation, means for supplying strips of fabric successively thereto to form an endless band, means for supplying a rubber covering to said band, and means for inserting separating ribbons between certain of said strips of fabric.

20. Apparatus of the character described comprising, a support of open formation, means for supplying strips of fabric successively thereto to form an endless band, an intermediate device for supporting the ends of the strips while they are being united, means for pressing the strips into close mutual contact, and means for inserting separating ribbons between certain of said strips of fabric.

21. Apparatus of the character described comprising, a support of open formation, means for supplying strips of fabric successively thereto to form an endless band, an intermediate device for supporting the ends of the strips while they are being united, means for supplying a rubber covering to said band, and means for inserting separating ribbons between certain of said strips of fabric.

22. Apparatus of the character described comprising, a support of open formation, means for supplying strips of fabric successively thereto to form an endless band, means for pressing the strips into close mutual contact, means for supplying a rubber covering to said band, and means for inserting separating ribbons between certain of said strips of fabric.

23. Apparatus of the character described comprising, a support of open formation, means for supplying strips of fabric successively thereto to form an endless band, means for pressing the strips into close mutual contact, means for supplying a rubber covering to said band, means for pressing said covering into close contact with the band, and means for inserting separating ribbons between certain of said strips of fabric.

In testimony, that I claim the foregoing as my invention, I have signed my name this 10th day of June, 1920.

LOUIS P. DESTRIBATS.